United States Patent
Kimba Dit Adamou et al.

(10) Patent No.: US 12,495,460 B2
(45) Date of Patent: Dec. 9, 2025

(54) INFORMATION INDICATION METHOD, INFORMATION OBTAINING METHOD, TERMINAL, AND NETWORK NODE

(71) Applicant: VIVO MOBILE COMMUNICATION CO., LTD., Chang'an Dongguan (CN)

(72) Inventors: Boubacar Kimba Dit Adamou, Chang'an Dongguan (CN); Xiaodong Yang, Chang'an Dongguan (CN); Qian Zheng, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/422,863

(22) Filed: Jan. 25, 2024

(65) Prior Publication Data
US 2024/0237119 A1  Jul. 11, 2024

Related U.S. Application Data

(60) Division of application No. 17/378,081, filed on Jul. 16, 2021, now Pat. No. 11,937,321, which is a
(Continued)

(30) Foreign Application Priority Data

Jan. 18, 2019 (CN) .......................... 201910056579.6

(51) Int. Cl.
*H04W 76/19* (2018.01)
*H04W 24/04* (2009.01)

(52) U.S. Cl.
CPC ........... *H04W 76/19* (2018.02); *H04W 24/04* (2013.01)

(58) Field of Classification Search
CPC ..... H04W 76/19; H04W 24/04; H04W 76/15; H04W 76/18
See application file for complete search history.

(56) References Cited

U.S. PATENT DOCUMENTS

2015/0036512 A1    2/2015  Xu et al.
2016/0338039 A1*  11/2016  Van Der Velde ..... H04L 5/0053
(Continued)

FOREIGN PATENT DOCUMENTS

CN     101835242 A     9/2010
CN     102281633 A    12/2011
(Continued)

OTHER PUBLICATIONS

International Search Report & Written Opinion related to Application No. PCT/CN2020/071918; reported on Mar. 11, 2020.
(Continued)

*Primary Examiner* — Sharmin Chowdhury
(74) *Attorney, Agent, or Firm* — von Briesen & Roper, s.c.

(57) ABSTRACT

The present invention provides an information indication method, an information obtaining method, a terminal, and a network node. The information indication method includes: sending indication information to the network node, where the indication information is used to indicate that the terminal detects a fast recovery failure FRF, the FRF is a failure of a fast recovery that is of a first link and that is initiated through a second link after a first link failure, the first link is a link between the terminal and a first node, and the second link is a link between the terminal and a second node

14 Claims, 2 Drawing Sheets

Send indication information to a network node

Related U.S. Application Data continuation of application No. PCT/CN2020/071918, filed on Jan. 14, 2020.

(56) References Cited

U.S. PATENT DOCUMENTS

| | | | |
|---|---|---|---|
| 2017/0195996 A1 | 7/2017 | Fujishiro | |
| 2018/0220484 A1 | 8/2018 | Wu | |
| 2019/0182881 A1* | 6/2019 | Teyeb | H04L 5/001 |
| 2020/0015142 A1 | 1/2020 | Jia et al. | |
| 2020/0059395 A1 | 2/2020 | Chen | |
| 2020/0322813 A1* | 10/2020 | Jia | H04W 24/10 |
| 2020/0374960 A1* | 11/2020 | Deenoo | H04B 7/0695 |

FOREIGN PATENT DOCUMENTS

| | | |
|---|---|---|
| CN | 108391324 A | 8/2018 |
| EP | 3048854 A1 | 7/2016 |
| WO | 2014067108 A1 | 5/2014 |
| WO | 2015170655 A1 | 11/2015 |
| WO | 2018170885 A1 | 9/2018 |

OTHER PUBLICATIONS

Extended European Search Report related to Application No. 20741667.8; reported on Feb. 15, 2022.

Vivo, "Discussion on beam failure recovery procedure", Agenda Item: 6.2.2.4, Document for: Discussion and Decision, 3GPP TSG RAN WG1 NR Ad Hoc #3, Nagoya, Japan, Sep. 18-21, 2017, R1-1715620.

ZTE, "Consideration on the RLF and beam failure in NR", WID/SID: NR_newRAT-Core, Document for: Discussion and Decision, 3GPP TSG-RAN WG2 Meeting #99, Berlin, Germany, Aug. 21-25, 2017, R2-1708118.

CATT, "CG failure handling for MR-DC", Agenda Item: 10.5.1, Document for: Discussion and Decision, 3GPP TSG-RAN WG2 Meeting #103bis, Chengdu, China, Oct. 8-12, 2018, R2-1813841.

Huawei, Hisilicon, "Discussion o MCG/SCG failure handling for NE-DC", Document for: Discussion and approval, 3GPP TSG-RAN WG2 Meeting #103bis, Chengdu, China, Oct. 8-12, 2018, R2-1814696.

Huawei, Hisilicon, "Handling on MN failure and SN failure for LTE NR tight interworking", Apr. 3-7, 2017, 3GPP TSG-RAN WG2 Meeting #97bis, Spokane, USA, R2-1703655.

ZTE, "Consideration on the RLF and beam failure in NR", Jun. 27-29, 2017, 3GPP TSG RAN WG2#NR_AdHoc#2, Qingdao, China, R2-1706675.

Ericsson, "MCG failure handling in case of NE-DC and NR-DC", Oct. 8-12, 2018, 3GPP TSG-RAN WG2#103bis, Chengdu, China, Tdoc R2-1814559, (Revision of R2-1812017).

Ericsson, "MCG failure handling in case of NE-DC and NR-DC", Oct. 8-12, 2018, 3GPP TSG-RAN WG2#103, Chengdu, China, R2-1814561.

Japanese Notice of Reasons for Refusal for related Application No. 2021-540422; reported on Sep. 7, 2022.

South Korean Request for the Submission of an Opinion for related Application No. 10-2021-7023550; reported on Feb. 21, 2023.

United States First Non-Final Office Action for related U.S. Appl. No. 17/378,081, reported on Jul. 17, 2023.

\* cited by examiner

INFORMATION INDICATION METHOD, INFORMATION OBTAINING METHOD, TERMINAL, AND NETWORK NODE

CROSS-REFERENCE TO RELATED APPLICATION

The present application is a divisional of U.S. patent application Ser. No. 17/378,081, filed on Jul. 16, 2021, which claims priority of Chinese Patent Application No. 201910056579.6, filed on Jan. 18, 2019 in China, both of which are incorporated herein by reference in their entireties.

TECHNICAL FIELD

The present disclosure relates to the field of communications technologies, and in particular, to an information indication method, an information obtaining method, a terminal, and a network node.

BACKGROUND

Dual connectivity is a technology introduced into a long term evolution (LTE) system, and is also used in a new radio (NR) system. Dual connectivity refers to that a terminal such as user equipment (UE) may be connected to two base stations at the same time, and the two base stations provide data receiving and sending services for the UE at the same time. In this way, because the UE can use radio resources of the two base stations at the same time, the service data transmission rate of the UE can be multiplied.

Serving base stations of dual-connectivity UE include one master node (MN) and one secondary node (SN). Each of the base stations can support carrier aggregation (CA). A network configures two special cells (special cell) for the dual-connectivity UE, that is, configures a serving cell of the MN to be a primary cell (Pcell) of the UE and configures a serving cell of the SN to be a primary secondary cell (PScell) of the UE. Other cells of the MN and the SN that serve the UE are secondary cells (Scell) of the UE. A set of cells of the MN can be referred to as a master cell group (MCG). The MCG includes the PCell and the SCell that are aggregated through CA. A set of cells of the SN can be referred to as a secondary cell group (SCG). The SCG includes the PSCell and the SCell that are aggregated through CA.

Currently, when the UE is dual connected to the MN and the SN, if the UE detects an MCG link failure (MCG link failure) in the MN, a method for fast recovering link is that the UE may perform reporting through an SCG link of the SN and recover the MCG link fast (Fast recovery, FR). The FR may fail (FRF).

However, currently, when the UE detects the FRF, a related network node cannot learn of the FRF.

SUMMARY

To resolve the foregoing technical problem, the embodiments of the present disclosure are implemented as follows:

According to a first aspect, an embodiment of the present disclosure provides an information indication method, applied to a terminal. The method includes:

sending indication information to a network node.

The indication information is used to indicate that the terminal detects a fast recovery failure FRF, the FRF is a failure of a fast recovery that is of a first link and that is initiated through a second link after a first link failure, the first link is a link between the terminal and a first node, and the second link is a link between the terminal and a second node.

According to a second aspect, an embodiment of the present disclosure provides an information obtaining method, applied to a network node. The method includes:

receiving the indication information sent by the terminal.

The indication information is used to indicate that the terminal detects an FRF, the FRF is a failure of a fast recovery that is of a first link and that is initiated through a second link after a first link failure, the first link is a link between the terminal and a first node, and the second link is a link between the terminal and a second node.

According to a third aspect, an embodiment of the present disclosure provides a terminal. The terminal includes:

a first sending module, configured to send indication information to a network node.

The indication information is used to indicate that the terminal detects an FRF, the FRF is a failure of a fast recovery that is of a first link and that is initiated through a second link after a first link failure, the first link is a link between the terminal and a first node, and the second link is a link between the terminal and a second node.

According to a fourth aspect, an embodiment of the present disclosure provides a network node. The network node includes:

a receiving module, configured to receive the indication information sent by a terminal.

The indication information is used to indicate that the terminal detects an FRF, the FRF is a failure of a fast recovery that is of a first link and that is initiated through a second link after a first link failure, the first link is a link between the terminal and a first node, and the second link is a link between the terminal and a second node.

According to a fifth aspect, an embodiment of the present disclosure provides a terminal. The terminal includes a memory, a processor, and a computer program that is stored in the memory and that can be run on the processor. When the computer program is executed by the processor, steps of the information indication method applied to the terminal are implemented.

According to a sixth aspect, an embodiment of the present disclosure provides a network node. The network node includes a memory, a processor, and a computer program that is stored in the memory and that can be run on the processor. When the computer program is executed by the processor, steps of the information obtaining method applied to the network node are implemented.

According to a seventh aspect, an embodiment of the present disclosure provides a computer-readable storage medium. The computer-readable storage medium stores a computer program. When the computer program is executed by the processor, steps of the information indication method applied to a terminal or steps of the information obtaining method applied to a network device are implemented.

DESCRIPTION OF EMBODIMENTS

It should be first noted that the embodiments of the present disclosure can be applied to not only a dual-connectivity scenario but also a multi-connectivity scenario. Multi-connectivity refers to that a terminal may be connected to a plurality of base stations, that is, more than two base stations that provide a service for the same terminal at the same time. Similar to that in dual connectivity, serving base stations of a multi-connectivity terminal includes one master node MN and other secondary nodes SNs.

In the embodiments of the present disclosure, in the dual-connectivity scenario, serving base stations, that is, one MN and one SN, of a dual-connectivity terminal may belong to a same radio access type (RAT), where for example, the MN and the SN are two LTE eNBs or two NR gNBs; or may belong to different RATs, where for example, one of the MN and the SN is an LTE eNB, and the other is an NR gNB. Similarly, in the multi-connectivity scenario, serving base stations of a multi-connectivity terminal may belong to a same RAT, or may belong to different RATs. That is, the embodiments of the present disclosure can be applied to dual-connectivity base stations or multi-connectivity base stations with any type combination, and a type of a base station is not limited.

In specific implementation, there may be a signaling interface that is between two base stations serving a same terminal and that is used by the two base stations to notify each other of configuration information related to the terminal.

The following describes an information indication method and an information obtaining method in the present disclosure in detail with reference to the embodiments and accompanying drawings.

Figure 1:
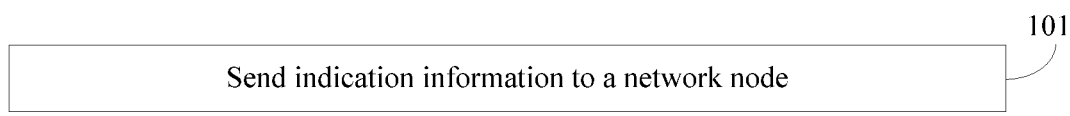
FIG. 1 is a flowchart of an information indication method according to an embodiment of the present disclosure.

Referring to FIG. 1, FIG. 1 is a flowchart of an information indication method according to an embodiment of the present disclosure. The method is applied to a terminal. As shown in FIG. 1, the method includes the following steps:

Step 101: Send indication information to a network node.

The indication information is used to indicate that the terminal detects a fast recovery failure (FRF). The FRF is a failure of a fast recovery that is of a first link and that is initiated through a second link after a first link failure, the first link is a link between the terminal and a first node, and the second link is a link between the terminal and a second node.

In this embodiment, optionally, the first link is a link between the terminal and an MCG of a master node, and the second link is a link between the terminal and an SCG of a secondary node. That is, the FRF is a failure of a fast MCG link recovery (FR) initiated through the SCG link of the secondary node after the terminal detects an MCG link failure (MCG link failure) in the master node.

Alternatively, the first link is a link between the terminal and an SCG of a secondary node, and the second link is a link between the terminal and an MCG of a master node. That is, the FRF is a failure of a fast SCG link recovery (FR) initiated through the MCG link of the master node after the terminal detects an SCG link failure (SCG link failure) in the secondary node.

According to the information indication method in this embodiment of the present disclosure, the indication information is sent to the network node, so that the related network node can learn of that the terminal detects the FRF, so as to optimize configurations for the terminal, thereby helping optimize an FR procedure.

In this embodiment of the present disclosure, optionally, the first link failure of the terminal, that is, the MCG link failure (MCG link failure) in the master node or the SCG link failure (SCG link failure) in the secondary node, may include at least one of the following:

a signaling radio bearer (SRB) integrity protection failure (SRB Integrity protection failure);
a radio resource control (RRC) reconfiguration failure (RRC Reconfiguration failure);
a handover failure (HOF);
a radio link failure (RLF); or
a handover failure after a conditional handover.

In this embodiment of the present disclosure, apart from being used to indicate that the terminal detects the FRF, the indication information may further be used to indicate information related to the FRF.

Specifically, when the first link is the link between the terminal and the MCG of the master node, and the second link is the link between the terminal and the SCG of the secondary node, the information related to the FRF may include at least one of the following:

an FRF type;
cell identification information of the secondary node, for example, a physical cell identifier (PCI) of an SCG cell;
cell signal related information of the secondary node;
cell identification information of the master node that initiates an FR, for example, a physical cell identifier (PCI) of an MCG cell; or
cell signal related information of the master node that initiates the FR.

The FRF type may be understood as a cause for the FRF. In this way, based on the FRF type reported by the terminal, the related network node can learn of the cause of the FRF of the terminal, so as to optimize configurations for the terminal, thereby helping optimize an FR procedure.

The cell identification information and the cell signal related information may be understood as auxiliary information. Based on the information, the related network node can learn of cell information related to the FRF, thereby helping optimize an FR procedure.

Further, the FRF type may include at least one of the following:

the terminal having not received an MCG reconfiguration message within a preset time;
a failure of the terminal to receive the MCG reconfiguration message on a bearer SRB 1 and/or a split bearer SRB 1S (i.e. MCG reconfiguration failure for RRC message on SRB1 and/or SRBIS);
an integrity protection failure of the SRB 1 and/or the SRB 1S (i.e. SRB1 and/or SRB1S integrity protection failure);
a lack of capability of the terminal to satisfy the received MCG reconfiguration (i.e. UE inability to comply with MCG reconfiguration);
a failure of a random access procedure initiated by the terminal based on the received MCG reconfiguration message (i.e. RACH failure using MCG reconfiguration with sync);
a failure of the terminal to report MCG link failure (MCG link failure) information;

a failure of the terminal to find a suitable MCG to initiate an FR; or an SCG link failure (SCG link failure) of the terminal in an FR procedure.

In this way, based on the cause of the FRF of the terminal which reports the FRF, the related network node can learn of the cause of the FRF of the terminal, thereby helping optimize configurations for the terminal.

The cell signal related information includes at least one of the following:

a reference signal received power (RSRP);

a reference signal received quality (RSRQ);

beam (Beam) information, for example, single side band (SSB) information, and/or physical broadcast channel (PBCH) information;

channel state information-reference signal (CSI-RS) information; or synchronization signal and PBCH block (SS block) information.

Specifically, when the first link is the link between the terminal and the SCG of the secondary node, and the second link is the link between the terminal and the MCG of the master node, information related to the FRF may include at least one of the following:

an FRF type;

cell identification information of the secondary node that initiates an FR;

cell signal related information of the secondary node that initiates the FR;

cell identification information of the master node; or cell signal related information of the master node.

The FRF type may be understood as a cause for the FRF. In this way, based on the FRF type reported by the terminal, the related network node can learn of the cause of the FRF of the terminal, so as to optimize configurations for the terminal, thereby helping optimize an FR procedure.

The cell identification information and the cell signal related information may be understood as auxiliary information. Based on the information, the related network node can learn of cell information related to the FRF, thereby helping optimize an FR procedure.

Further, the FRF type may include at least one of the following:

the terminal having not received an SCG reconfiguration message within a preset time;

a failure of the terminal to receive an SCG reconfiguration message on an SRB 1 and/or an SRB 1S (i.e. SCG reconfiguration failure for RRC message on SRB1 and/or SRB1S);

an integrity protection failure of the SRB 1 and/or the SRB 1S (i.e. SRB1 and/or SRB1S integrity protection failure);

a lack of capability of the terminal to satisfy the received SCG reconfiguration (i.e. UE inability to comply with SCG reconfiguration);

a failure of a random access procedure initiated by the terminal based on the received SCG reconfiguration message (RACH failure using SCG reconfiguration with sync);

a failure of the terminal to report SCG link failure (SCG link failure) information;

a failure of the terminal to find a suitable SCG to initiate an FR; or an MCG link failure (MCG link failure) of the terminal in an FR procedure.

The cell signal related information includes at least one of the following:

an RSRP, an RSRQ, beam information, CSI-RS information, or SS block information.

Figure 2:
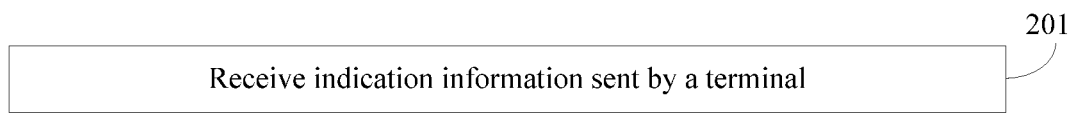
FIG. 2 is a flowchart of an information obtaining method according to an embodiment of the present disclosure.

In this embodiment of the present disclosure, the foregoing network node may be any one of the following:

a cell that is of the secondary node and that is connected to the terminal, where in this case, the terminal is connected to an SCG cell and reports the indication information to the SCG cell, and the SCG cell may forward the indication information to an MCG cell related to the FRF;

a cell that is of the secondary node and that is reconnected to the terminal, where in this case, the terminal is reconnected to an SCG cell and reports the indication information to the SCG cell, and the SCG cell may forward the indication information to an MCG cell related to the FRF;

a cell that is of the master node and that is reconnected to the terminal, where in this case, the terminal is reconnected to an MCG cell and reports the indication information to the MCG cell, and the MCG cell may forward the indication information to an SCG cell related to the FRF;

a cell that is of a target secondary node and that is reconnected to the terminal, where in this case, the terminal is reconnected to a target SCG cell and reports the indication information to the target SCG cell, and the target SCG cell may forward the indication information to a source SCG cell and/or a source MCG cell related to the FRF; and a cell that is of a target master node and that is reconnected to the terminal, where in this case, the terminal is reconnected to a target MCG cell and reports the indication information to the target MCG cell, and the target MCG cell may forward the indication information to a source SCG cell and/or a source MCG cell related to the FRF;

Referring to FIG. 2, FIG. 2 is a flowchart of an information obtaining method according to an embodiment of the present disclosure. The method is applied to a network node. As shown in FIG. 2, the method includes the following steps:

Step 201: Receive indication information sent by a terminal.

The indication information is used to indicate that the terminal detects an FRF, the FRF is a failure of a fast recovery that is of a first link and that is initiated through a second link after a first link failure, the first link is a link between the terminal and a first node, and the second link is a link between the terminal and a second node.

According to the information obtaining method in this embodiment of the present disclosure, the indication information sent by the terminal is received, so that the related network node can learn of that the terminal detects the FRF, so as to optimize configurations for the terminal, thereby helping optimize an FR procedure.

In this embodiment of the present disclosure, optionally, the first link is a link between the terminal and an MCG of a master node, and the second link is a link between the terminal and an SCG of a secondary node;

or the first link is a link between the terminal and an SCG of a secondary node, and the second link is a link between the terminal and an MCG of a master node.

Optionally, the first link is the link between the terminal and the MCG of the master node, and the second link is the link between the terminal and the SCG of the secondary node.

The indication information is further used to indicate information related to the FRF, where the information related to the FRF includes at least one of the following:
 an FRF type;
 cell identification information of the secondary node;
 cell signal related information of the secondary node;
 cell identification information of the master node that initiates a fast recovery FR; or
 cell signal related information of the master node that initiates the FR.

Optionally, the FRF type includes at least one of the following:
 the terminal having not received an MCG reconfiguration message within a preset time;
 a failure of the terminal to receive the MCG reconfiguration message on an SRB 1 and/or an SRB 1S;
 an integrity protection failure of the SRB 1 and/or the SRB 1S;
 a lack of capability of the terminal to satisfy the received MCG reconfiguration;
 a failure of a random access procedure initiated by the terminal based on the received MCG reconfiguration message;
 a failure of the terminal to report MCG link failure information;
 a failure of the terminal to find a suitable MCG to initiate an FR; or
 an SCG link failure of the terminal in an FR procedure.

Optionally, the first link is the link between the terminal and the SCG of the secondary node, and the second link is the link between the terminal and the MCG of the master node.

The indication information is further used to indicate information related to the FRF, where the information related to the FRF includes at least one of the following:
 an FRF type;
 cell identification information of the secondary node that initiates an FR;
 cell signal related information of the secondary node that initiates the FR;
 cell identification information of the master node; or
 cell signal related information of the master node.

Optionally, the FRF type includes at least one of the following:
 the terminal having not received an SCG reconfiguration message within a preset time;
 a failure of the terminal to receive an SCG reconfiguration message on an SRB 1 and/or an SRB 1S;
 an integrity protection failure of the SRB 1 and/or the SRB 1S;
 a lack of capability of the terminal to satisfy the received SCG reconfiguration;
 a failure of a random access procedure initiated by the terminal based on the received SCG reconfiguration message;
 a failure of the terminal to report SCG link failure information;
 a failure of the terminal to find a suitable SCG to initiate an FR; or
 an MCG link failure of the terminal in an FR procedure.

Optionally, the network node is any one of the following:
 a cell that is of the secondary node and that is connected to the terminal;
 a cell that is of the secondary node and that is reconnected to the terminal;
 a cell that is of the master node and that is reconnected to the terminal;
 a cell that is of a target secondary node and that is reconnected to the terminal; and
 a cell that is of a target master node and that is reconnected to the terminal.

Optionally, after step 201, the method further includes:
 forwarding the indication information to a target node.

The target node is at least one of a secondary node cell and a master node cell that are related to the FRF.

Optionally, the first link failure may include at least one of the following:
 an SRB integrity protection failure;
 an RRC reconfiguration failure;
 a handover failure;
 a radio link failure; or
 a handover failure after a conditional handover.

The foregoing embodiment describes the information indication method in the present disclosure. A terminal corresponding to the information indication method in the present disclosure is described below with reference to an embodiment and the accompanying drawings.

Figure 3:
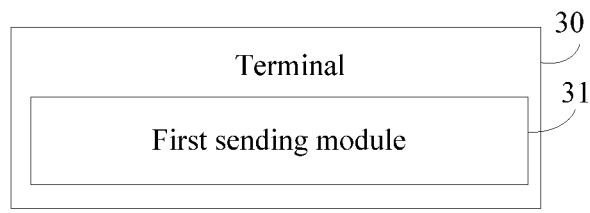
FIG. 3 is a first schematic structural diagram of a terminal according to an embodiment of the present disclosure.

Referring to FIG. 3, FIG. 3 is a schematic structural diagram of a terminal according to an embodiment of the present disclosure. As shown in FIG. 3, the terminal 30 includes:
 a first sending module 31, configured to send indication information to a network node.

The indication information is used to indicate that the terminal detects an FRF, the FRF is a failure of a fast recovery that is of a first link and that is initiated through a second link after a first link failure, the first link is a link between the terminal and a first node, and the second link is a link between the terminal and a second node.

In this embodiment of the present disclosure, the terminal 30 sends the indication information to the network node, so that the related network node can learn of that the terminal detects the FRF, so as to optimize configurations for the terminal, thereby helping optimize an FR procedure.

Optionally, the first link is a link between the terminal and an MCG of a master node, and the second link is a link between the terminal and an SCG of a secondary node;
 or
 the first link is a link between the terminal and an SCG of a secondary node, and the second link is a link between the terminal and an MCG of a master node.

Optionally, when the first link is the link between the terminal and the MCG of the master node, and the second link is the link between the terminal and the SCG of the secondary node, the indication information is further used to indicate information related to the FRF, where the information related to the FRF includes at least one of the following:
 an FRF type;
 cell identification information of the secondary node;
 cell signal related information of the secondary node;
 cell identification information of the master node that initiates an FR; or
 cell signal related information of the master node that initiates the FR.

Optionally, the FRF type includes at least one of the following:
 the terminal having not received an MCG reconfiguration message within a preset time;
 a failure of the terminal to receive the MCG reconfiguration message on a bearer SRB 1 and/or a split bearer SRB 1S;
 an integrity protection failure of the SRB 1 and/or the SRB 1S;

a lack of capability of the terminal to satisfy the received MCG reconfiguration;
a failure of a random access procedure initiated by the terminal based on the received MCG reconfiguration message;
a failure of the terminal to report MCG link failure information;
a failure of the terminal to find a suitable MCG to initiate an FR; or
an SCG link failure of the terminal in an FR procedure.

Optionally, the first link is the link between the terminal and the SCG of the secondary node, and the second link is the link between the terminal and the MCG of the master node.

The indication information is further used to indicate information related to the FRF, where the information related to the FRF includes at least one of the following:
an FRF type;
cell identification information of the secondary node that initiates an FR;
cell signal related information of the secondary node that initiates the FR;
cell identification information of the master node; or
cell signal related information of the master node.

Optionally, the FRF type includes at least one of the following:
the terminal having not received an SCG reconfiguration message within a preset time;
a failure of the terminal to receive the SCG reconfiguration message on an SRB 1 and/or an SRB 1S;
an integrity protection failure of the SRB 1 and/or the SRB 1S;
a lack of capability of the terminal to satisfy the received SCG reconfiguration;
a failure of a random access procedure initiated by the terminal based on the received SCG reconfiguration message;
a failure of the terminal to report SCG link failure information;
a failure of the terminal to find a suitable SCG to initiate an FR; or
an MCG link failure of the terminal in an FR procedure.

Optionally, the cell signal related information includes at least one of the following:
an RSRP, an RSRQ, beam information, CSI-RS information, or SS block information.

Optionally, the network node is any one of the following:
a cell that is of the secondary node and that is connected to the terminal;
a cell that is of the secondary node and that is reconnected to the terminal;
a cell that is of the master node and that is reconnected to the terminal;
a cell that is of a target secondary node and that is reconnected to the terminal; and
a cell that is of a target master node and that is reconnected to the terminal.

Optionally, the first link failure includes at least one of the following:
an SRB integrity protection failure;
an RRC reconfiguration failure;
a handover failure;
a radio link failure; or
a handover failure after a conditional handover.

Figure 4:
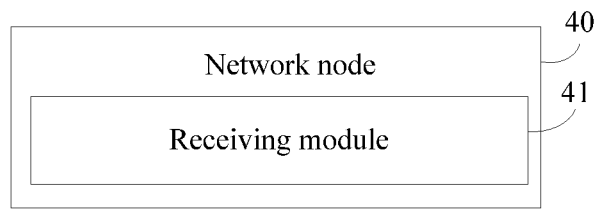
FIG. 4 is a first schematic structural diagram of a network node according to an embodiment of the present disclosure.

Referring to FIG. 4, FIG. 4 is a schematic structural diagram of a network node according to an embodiment of the present disclosure. As shown in FIG. 4, the network node 40 includes:
a receiving module 41, configured to receive indication information sent by a terminal.

The indication information is used to indicate that the terminal detects an FRF, the FRF is a failure of a fast recovery that is of a first link and that is initiated through a second link after a first link failure, the first link is a link between the terminal and a first node, and the second link is a link between the terminal and a second node.

In this embodiment of the present disclosure, the network node 40 receives the indication information sent by the terminal, so that the related network node can learn of that the terminal detects the FRF, so as to optimize configurations for the terminal, thereby helping optimize an FR procedure.

Optionally, the first link is a link between the terminal and an MCG of a master node, and the second link is a link between the terminal and an SCG of a secondary node; or
the first link is a link between the terminal and an SCG of a secondary node, and the second link is a link between the terminal and an MCG of a master node.

Optionally, when the first link is the link between the terminal and the MCG of the master node, and the second link is the link between the terminal and the SCG of the secondary node, the indication information is further used to indicate information related to the FRF, where the information related to the FRF includes at least one of the following:
an FRF type;
cell identification information of the secondary node;
cell signal related information of the secondary node;
cell identification information of the master node that initiates a fast recovery FR; or
cell signal related information of the master node that initiates the FR.

Optionally, the FRF type includes at least one of the following:
the terminal having not received an MCG reconfiguration message within a preset time;
a failure of the terminal to receive the MCG reconfiguration message on an SRB 1 and/or an SRB 1S;
an integrity protection failure of the SRB 1 and/or the SRB 1S;
a lack of capability of the terminal to satisfy the received MCG reconfiguration;
a failure of a random access procedure initiated by the terminal based on the received MCG reconfiguration message;
a failure of the terminal to report MCG link failure information;
a failure of the terminal to find a suitable MCG to initiate an FR; or
an SCG link failure of the terminal in an FR procedure.

Optionally, when the first link is the link between the terminal and the SCG of the secondary node, and the second link is the link between the terminal and the MCG of the master node, the indication information is further used to indicate information related to the FRF, where the information related to the FRF includes at least one of the following:
an FRF type;
cell identification information of the secondary node that initiates an FR;
cell signal related information of the secondary node that initiates the FR;

cell identification information of the master node; or cell signal related information of the master node.

Optionally, the FRF type includes at least one of the following:
the terminal having not received an SCG reconfiguration message within a preset time;
a failure of the terminal to receive the SCG reconfiguration message on an SRB 1 and/or an SRB 1S;
an integrity protection failure of the SRB 1 and/or the SRB 1S;
a lack of capability of the terminal to satisfy the received SCG reconfiguration;
a failure of a random access procedure initiated by the terminal based on the received SCG reconfiguration message;
a failure of the terminal to report SCG link failure information;
a failure of the terminal to find a suitable SCG to initiate an FR; or
an MCG link failure of the terminal in an FR procedure.

Optionally, the network node is any one of the following:
a cell that is of the secondary node and that is connected to the terminal;
a cell that is of the secondary node and that is reconnected to the terminal;
a cell that is of the master node and that is reconnected to the terminal;
a cell that is of a target secondary node and that is reconnected to the terminal; and
a cell that is of a target master node and that is reconnected to the terminal.

Optionally, the network node 40 further includes:
a second sending module, configured to forward the indication information to a target node.

The target node is at least one of a secondary node cell and a master node cell that are related to the FRF.

Optionally, the first link failure includes at least one of the following:
an SRB integrity protection failure;
an RRC reconfiguration failure;
a handover failure;
a radio link failure; or
a handover failure after a conditional handover.

In addition, an embodiment of the present disclosure further provides a terminal. The terminal includes a processor, a memory, and a computer program that is stored in the memory and that can be run on the processor. When the computer program is executed by the processor, processes in the information indication method embodiment applied to the terminal are implemented, and a same technical effect can be achieved. To avoid repetition, details are not described herein again.

Figure 5:
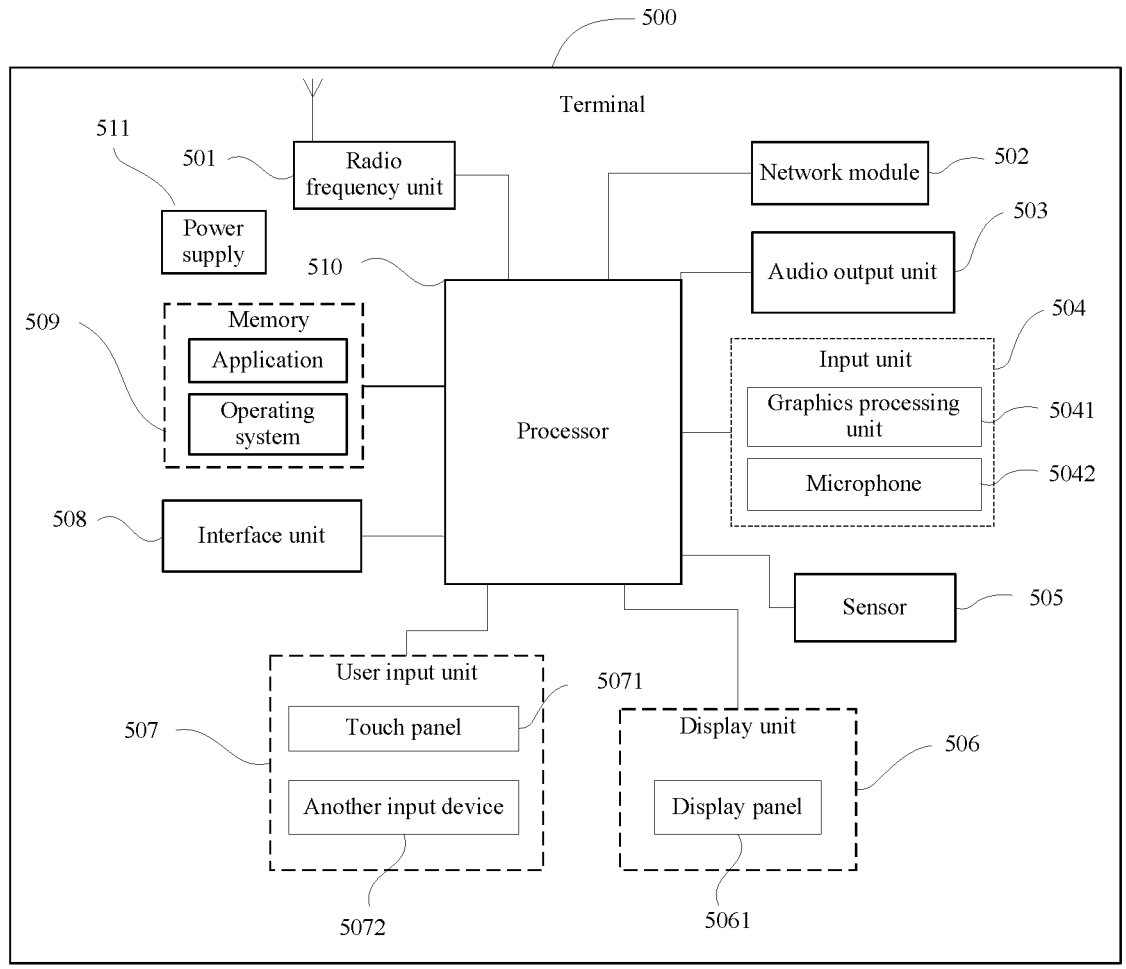
FIG. 5 is a second schematic structural diagram of a terminal according to an embodiment of the present disclosure.

Specifically, FIG. 5 is a schematic diagram of a hardware structure of a terminal implementing embodiments of the present disclosure. The terminal 500 includes but is not limited to: a radio frequency unit 501, a network module 502, an audio output unit 503, an input unit 504, a sensor 505, a display unit 506, a user input unit 507, an interface unit 508, a memory 509, a processor 510, a power supply 511, and another component. A person skilled in the art may understand that the structure of the terminal shown in FIG. 5 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, a vehicle-mounted terminal, a wearable device, a pedometer, and the like.

The radio frequency unit 501 is configured to send indication information to a network node. The indication information is used to indicate that the terminal detects an FRF, the FRF is a failure of a fast recovery that is of a first link and that is initiated through a second link after a first link failure, the first link is a link between the terminal and a first node, and the second link is a link between the terminal and a second node.

In this embodiment of the present disclosure, the terminal 500 can implement processes implemented in the foregoing method embodiment shown in FIG. 1, and a same beneficial effect can be achieved. To avoid repetition, details are not described herein again.

It should be understood that in this embodiment of the present disclosure, the radio frequency unit 501 may be configured to receive and send signals in a process of receiving and sending information or calling. Specifically, after receiving downlink data from a base station, the radio frequency unit 501 sends the downlink data to the processor 510 for processing; and sends uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and another device by using a wireless communications system.

The terminal provides wireless broadband Internet access for a user by using the network module 502, for example, helps the user to receive and send an e-mail, brow a web page, and access streaming media.

The audio output unit 503 may convert audio data received by the radio frequency unit 501 or the network module 502 or stored in the memory 509 into an audio signal and output as voice. In addition, the audio output unit 503 may further provide audio output (for example, a call signal received voice or a message received voice) related to a specific function performed by the terminal 500. The audio output unit 503 includes a loudspeaker, a buzzer, a receiver, and the like.

The input unit 504 is configured to receive an audio signal or a video signal. The input unit 504 may include a graphics processing unit (GPU) 5041 and a microphone 5042. The graphics processing unit 5041 processes image data of a static picture or video obtained by an image capturing apparatus (for example, a camera lens) in a video capturing mode or an image capturing mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 may receive sound and can process such sound into audio data. The processed audio data may be converted, in a calling mode, into a format that can be sent to a mobile communication base station by using the radio frequency unit 501 for output.

The terminal 500 further includes at least one sensor 505, for example, a light sensor, a motion sensor, and another sensor. Specifically, the light sensor includes an ambient light sensor and a proximity sensor, where the ambient light sensor can adjust brightness of a display panel 5061 based on brightness of ambient light, and the proximity sensor can turn off the display panel 5061 and/or backlight when the terminal 500 is moved towards the ear. As a type of motion sensor, an accelerometer sensor may detect acceleration values in directions (that are generally three axes), and detect a value and a direction of gravity when the accelerometer sensor is static, and may be configured to: recognize a terminal posture (for example, screen switching between landscape and portrait modes, a related game, or magnetometer posture calibration), and perform a function related to vibration recognition (for example, a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein again.

The display unit 506 is configured to display information entered by a user or information provided for the user. The display unit 506 may include the display panel 5061. The display panel 5061 may be configured in a form of a liquid crystal display (LCD), an organic light-emitting diode (OLED), or the like.

The user input unit 507 may be configured to: receive input digit or character information, and generate key signal input related to user setting and function control of the terminal. Specifically, the user input unit 507 includes a touch panel 5071 and another input device 5072. The touch panel 5071 is also referred to as a touchscreen, and may collect a touch operation of the user on or near the touch panel 5071 (for example, an operation performed on or near the touch panel 5071 by the user by using any appropriate object or accessory such as a finger or a stylus). The touch panel 5071 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into contact coordinates, sends the contact coordinates to the processor 510, and receives and executes a command from the processor 510. In addition, the touch panel 5071 may be implemented by using a plurality of types such as a resistive type, a capacitive type, an infrared ray type, and a surface acoustic wave type. The user input unit 507 may further include another input device 5072 in addition to the touch panel 5071. Specifically, the another input device 5072 may include but is not limited to a physical keyboard, function keys (for example, a volume control key and an on/off key), a trackball, a mouse, and a joystick. Details are not described herein.

Further, the touch panel 5071 may cover the display panel 5061. When detecting the touch operation on or near the touch panel 5071, the touch panel 5071 transmits the touch operation to the processor 510 to determine a type of the touch event, and then the processor 510 provides corresponding visual output on the display panel 5061 based on the type of the touch event. In FIG. 5, although the touch panel 5071 and the display panel 5061 are used as two independent parts to implement input and output functions of the terminal, in some embodiments, the touch panel 5071 and the display panel 5061 may be integrated to implement the input and output functions of the terminal. This is not specifically limited herein.

The interface unit 508 is an interface connecting an external apparatus to the terminal 500. For example, the external apparatus may include a wired or wireless headphone port, an external power supply (or a battery recharger) port, a wired or wireless data port, a memory card port, a port for link with an apparatus having an identification module, an audio input/output(I/O) port, a video I/O port, an earphone port, and the like. The interface unit 508 may be configured to: receive input (for example, data information and power) from an external apparatus, and transmit the received input to one or more elements inside the terminal 500; or may be configured to transmit data between the terminal 500 and the external apparatus.

The memory 509 may be configured to store a software program and various data. The memory 509 may mainly include a program storage area and a data storage area. The program storage area may store an operating system, an application for at least one function (for example, a sound play function or an image play function), and the like. The data storage area may store data (for example, audio data or an address book) or the like created based on use of the mobile phone. In addition, the memory 509 may include a high-speed random access memory, or may include a nonvolatile memory, for example, at least one disk storage device, a flash memory, or another volatile solid-state storage device.

The processor 510 is a control center of the terminal, and connects all parts of the entire terminal through various interfaces and lines. By running or executing a software program and/or a module stored in the memory 509 and invoking data stored in the memory 509, the processor 510 performs various functions of the terminal and data processing, to perform overall monitoring on the terminal. The processor 510 may include one or more processing units. Optionally, an application processor and a modem processor may be integrated into the processor 510. The application processor mainly processes an operating system, a user interface, an application, and the like. The modem processor mainly processes wireless communication. It can be understood that, alternatively, the modem processor may not be integrated into the processor 510.

The terminal 500 may further include a power supply 511 (for example, a battery) that supplies power to various components. Optionally, the power supply 511 may be logically connected to the processor 510 through a power supply management system, to perform functions of managing charging, discharging, and power consumption through the power supply management system.

In addition, the terminal 500 may further include some functional modules not shown. Details are not described herein again.

An embodiment of the present disclosure further provides a network node. The network node includes a processor, a memory, and a computer program that is stored in the memory and that can be run on the processor. When the computer program is executed by the processor, processes of the information obtaining method embodiment applied to the network node are implemented, and a same technical effect can be achieved. To avoid repetition, details are not described herein again.

Figure 6:
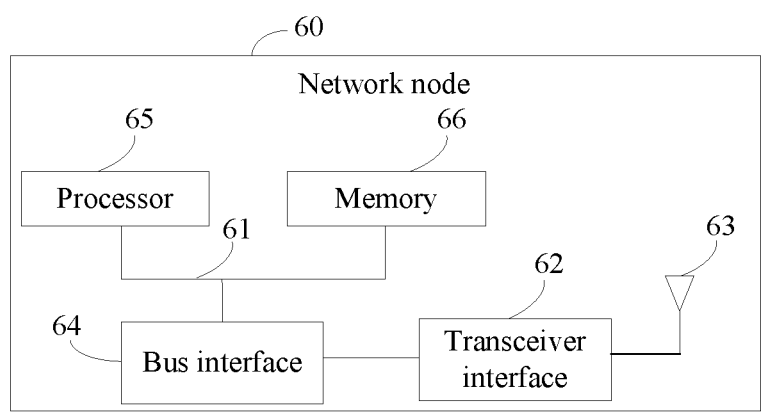
FIG. 6 is a second schematic structural diagram of a network node according to an embodiment of the present disclosure.

Specifically, FIG. 6 is a schematic diagram of a hardware structure of a network node implementing embodiments of the present disclosure. The network node 60 includes but is not limited to a bus 61, a transceiver interface 62, an antenna 63, a bus interface 64, a processor 65, and a memory 66.

In this embodiment of the present disclosure, the network node 60 further includes a computer program that is stored in the memory 66 and that can be run on the processor 65. When the computer program is executed by the processor 65, processes implemented in the foregoing method embodiment shown in FIG. 2 can be implemented, and a same beneficial effect can be achieved. To avoid repetition, details are not described herein again.

The transceiver interface 62 is configured to receive and send data under control of the processor 65.

In FIG. 6, for a bus architecture (represented by the bus 61), the bus 61 may include any quantity of interconnected buses and bridges, and the bus 61 interconnects various circuits of one or more processors represented by the processor 65 and of a memory represented by the memory 66. The bus 61 may further interconnect various other circuits, for example, a peripheral device, a voltage regulator, and a power management circuit. These are all well known in the art. Therefore, this specification provides no further description. The bus interface 64 is an interface provided between the bus 61 and the transceiver interface 62. The transceiver interface 62 may be one or more elements, for example, a plurality of receivers and transmitters, and provides a unit configured to communicate with various other apparatuses on a transmission medium. Data processed by the processor 65 is transmitted on a wireless medium by using the antenna 63. The antenna 63 further receives data and transmits the data to the processor 65.

The processor 65 is responsible for managing the bus 61 and general processing, and may further provide various functions, including timing, peripheral interfacing, voltage regulation, power management, and another control function. The memory 66 may be configured to store data used by the processor 65 when performing an operation.

Optionally, the processor 65 may be a CPU, an ASIC, an FPGA, or a CPLD.

An embodiment of the present disclosure further provides a computer-readable storage medium. The computer-readable storage medium stores a computer program. When the computer program is executed by a processor, processes of the information indication method embodiment applied to a terminal or processes of the information obtaining method embodiment applied to a network node are implemented, and a same technical effect can be achieved. To avoid repetition, details are not described herein again. The computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiments may be implemented by using software in addition to a necessary universal hardware platform, or by using hardware only. In most circumstances, the former is a preferred implementation. Based on such an understanding, the technical solutions of the present disclosure essentially or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network node, or the like) to perform the methods described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

The invention claimed is:

1. An information indication method, applied to a terminal, and comprising:
  sending indication information to a network node, wherein the network node comprises a master node;
  the indication information is used to indicate that the terminal detects a fast recovery failure FRF, the FRF is a failure of a fast recovery that is of a first link and that is initiated through a second link after a first link failure;
  wherein the first link is the link between the terminal and a secondary cell group (SCG) of a secondary node, and the second link is the link between the terminal and a master cell group (MCG) of the master node; and
  the indication information is further used to indicate information related to the FRF, wherein the information related to the FRF comprises:
  an FRF type;
  wherein the FRF type comprises:
  a failure of the terminal to receive an SCG reconfiguration message on an SRB 1 and/or an SRB 1S.

2. The method according to claim 1, wherein the information related to the FRF further comprises at least one of the following:
  cell identification information of the secondary node that initiates an FR;
  cell signal related information of the secondary node that initiates the FR;
  cell identification information of the master node; or
  cell signal related information of the master node.

3. The method according to claim 1, wherein the network node is any one of the following: a cell that is of a secondary node and that is connected to the terminal;
  a cell that is of the secondary node and that is reconnected to the terminal;
  a cell that is of a master node and that is reconnected to the terminal;
  a cell that is of a target secondary node and that is reconnected to the terminal; or
  a cell that is of a target master node and that is reconnected to the terminal.

4. The method according to claim 1, wherein the first link failure comprises at least one of the following:
  a signaling radio bearer SRB integrity protection failure;
  a radio resource control RRC reconfiguration failure;
  a handover failure;
  a radio link failure; or
  a handover failure after a conditional handover.

5. The method according to claim 1, wherein the FRF type further comprises:
  the terminal having not received an SCG reconfiguration message within a preset time.

6. An information obtaining method, applied to a network node, wherein the network node comprises a master node, wherein the method comprises:
  receiving the indication information sent by the terminal;
  the indication information is used to indicate that the terminal detects an FRF, the FRF is a failure of a fast recovery that is of a first link and that is initiated through a second link after a first link failure;
wherein the first link is the link between the terminal and a secondary cell group (SCG) of a secondary node, and the second link is the link between the terminal and a master cell group (MCG) of the master node; and
the indication information is further used to indicate information related to the FRF, wherein the information related to the FRF comprises:
an FRF type;
wherein the FRF type comprises:
a failure of the terminal to receive an SCG reconfiguration message on an SRB 1 and/or an SRB 1S.

7. The method according to claim 6,
wherein the information related to the FRF further comprises at least one of the following:
cell identification information of the secondary node that initiates an FR;
cell signal related information of the secondary node that initiates the FR;
cell identification information of the master node; or
cell signal related information of the master node.

8. The method according to claim 6, wherein after the receiving indication information sent by a terminal, the method further comprises:
forwarding the indication information to a target node, the target node is at least one of a secondary node cell and a master node cell that are related to the FRF.

9. The method according to claim 6, wherein the FRF type further comprises:
the terminal having not received an SCG reconfiguration message within a preset time.

10. A terminal, comprising a memory, a processor, and a computer program that is stored in the memory and that can be run on the processor, wherein the computer program, when is executed by the processor, causes the processor to:
send indication information to a network node, wherein the network node comprises a master node;
the indication information is used to indicate that the terminal detects a fast recovery failure FRF, the FRF is a failure of a fast recovery that is of a first link and that is initiated through a second link after a first link failure;
wherein the first link is the link between the terminal and a secondary cell group (SCG) of a secondary node, and the second link is the link between the terminal and a master cell group (MCG) of the master node; and
the indication information is further used to indicate information related to the FRF, wherein the information related to the FRF comprises:
an FRF type;
wherein the FRF type comprises:
a failure of the terminal to receive an SCG reconfiguration message on an SRB 1 and/or an SRB 1S.

11. The terminal according to claim 10,
wherein the information related to the FRF further comprises at least one of the following:
cell identification information of the secondary node that initiates an FR;
cell signal related information of the secondary node that initiates the FR;
cell identification information of the master node; or
cell signal related information of the master node.

12. The terminal according to claim 10, wherein the network node is any one of the following: a cell that is of a secondary node and that is connected to the terminal;
a cell that is of the secondary node and that is reconnected to the terminal;
a cell that is of a master node and that is reconnected to the terminal;
a cell that is of a target secondary node and that is reconnected to the terminal; or
a cell that is of a target master node and that is reconnected to the terminal.

13. The terminal according to claim 10, wherein the first link failure comprises at least one of the following:
a signaling radio bearer SRB integrity protection failure;
a radio resource control RRC reconfiguration failure;
a handover failure;
a radio link failure; or
a handover failure after a conditional handover.

14. The method according to claim 10, wherein the FRF type further comprises:
the terminal having not received an SCG reconfiguration message within a preset time.

* * * * *